United States Patent Office 3,027,321
Patented Mar. 27, 1962

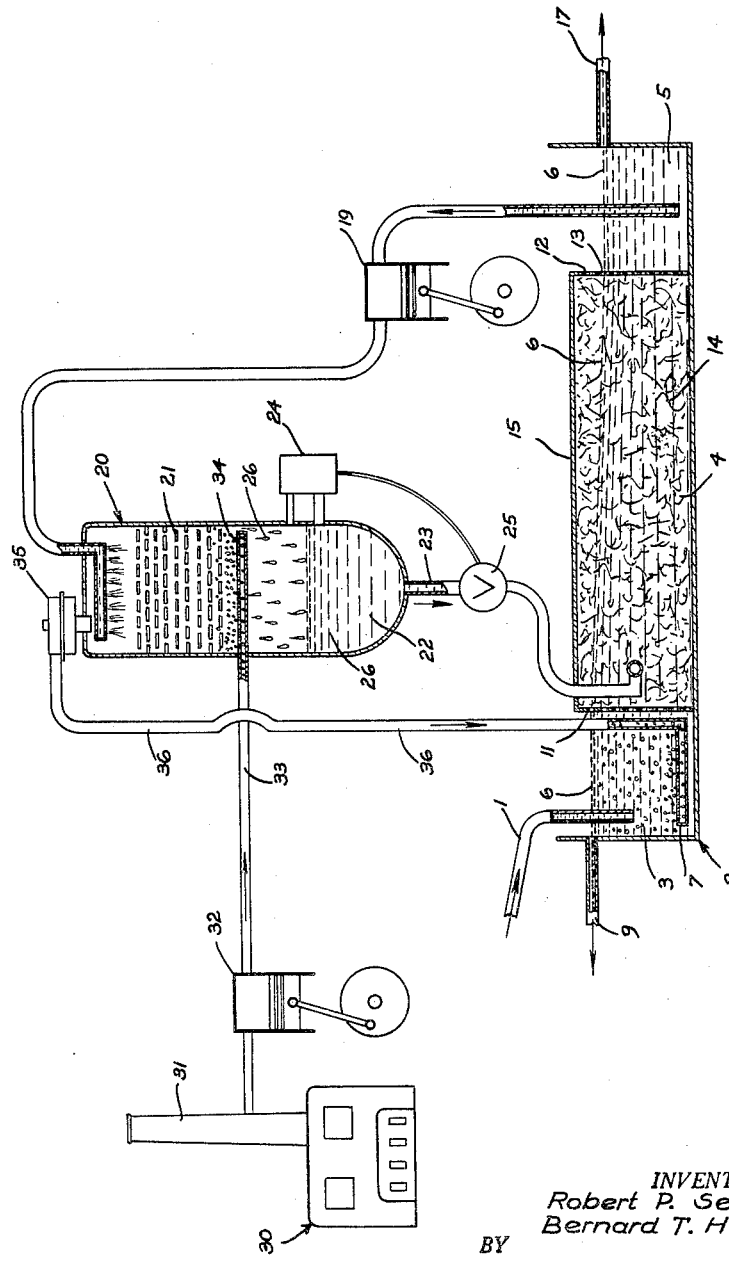

3,027,321
TREATMENT OF CHROMATE SOLUTIONS
Robert P. Selm and Bernard T. Hulse, Salina, Kans., assignors to Wilson & Company, Engineers & Architects, Salina, Kans., a partnership
Filed Nov. 9, 1959, Ser. No. 851,905
6 Claims. (Cl. 210—59)

This invention relates to the treatment of aqueous solutions containing chromate ions, and to the formation of a comparatively unobjectionable and readily disposable residue therefrom.

In the metal plating and metal finishing industry, large quantities of waste water containing chromate ions are often produced. Such effluent water presents a serious disposal problem because of its toxic effect upon wildlife and vegetation. If such waste water is dumped into streams or other public bodies of water, it will pollute same; the resultant killing of fish and marine life may cause further pollution which will render the water unfit for human consumption. Due to the strict enforcement of anti-pollution laws, it has become necessary for industry to carefully avoid the indiscriminate dumping of toxic chromate waste and, heretofore, they have had to resort to difficult and expensive methods of treating waste water to remove chromate toxicity.

An object of this invention is to provide a chromate reduction process which will effectively remove chromate ions from solution at low cost.

A further object of this invention is to provide a treatment for effluent waste water containing chromates in solution which is effective over a wide range of concentrations and pH values.

A further object of the present invention is to provide a process for the removal of chromates in solution which operates at high flow rates and without appreciable operator attendance, and which utilizes very low cost waste materials as treating agents.

A further object of the present invention is to provide a process wherein toxic compounds of chromium in solution are carried away as relatively inert hydroxides.

A further object of this invention is to provide a process of treating waste water containing toxic chromates in solution wherein said water has carbon dioxide dissolved therein to render it corrosive to ferrous materials, treating said water by contacting it with ferrous materials, and repeating the carbon dioxide dissolving and ferrous material contacting steps to effect a substantially complete removal of the chromates from solution.

Other objects and advantages of this invention will become apparent from the following description taken in connection with the accompanying drawing, wherein are set forth by way of illustration and example certain embodiments of this invention.

FIG. 1 is a diagrammatic view of treating apparatus and flow of material therethrough.

This process is most easily understood from a consideration of the treating apparatus and flow of material therethrough as shown in FIG. 1. Inlet pipe 1 discharges the chromate-containing water into tank 2. Tank 2 contains three sections, a separator section 3, treating section 4 and outlet section 5. However, for the purposes of this process, sections 3, 4 and 5 could be separate tanks. Separator section 3 contains a bubbler plate 7 or gas discharge nozzle which disperses bubbles of gas adjacent the bottom of the separator section 3 for purposes which will appear below. The separator section 3 has a draw-off device or pipe 9 spaced upwardly from the bubbler plate 7 and preferably positioned at the desired level of liquid in said separator section. The treating section 4 is separated from the other sections of tank 2 by spaced transverse baffles 11 and 12 which are perforated to provide a plurality of small openings 13 to freely allow fluid to pass therethrough but retain ferrous metal chips or particles 14. The baffles 11 and 12 and the side walls of tank 2 define a treating bed 15. The outlet section 5 has a draw-off or pipe 17 into which the treated effluent flows, said pipe 17 being spaced upwardly from the bottom of said outlet section to discharge the effluent from above a desired liquid level therein. A pump 19 withdraws fluid from the tank outlet section 5 and pumps it under pressure into an absorption tower 20 where it passes through bubble caps or packing 21 finding its way to a bottom storage portion 22 of the absorption tower. A flow line 23 communicates said bottom storage portion 22 with the treating section 4. A level control 24 operates valve 25 in the flow line 23 to prevent the liquid 26 from falling below a predetermined level and thereby prevents the absorption tower from losing gas pressure through the flow line 23 in case of low fluid inlet flow. The solution leaves the bottom of the absorption tower through the fluid line 23 and enters directly into the ferrous metal chip treating bed 15 adjacent the baffle 11 in tank 2. Carbon dioxide, which, for this process, may be used in the form of waste flue gas, is obtained by tapping boiler stack 31 of boiler 30. The flue gas is pumped to an appropriate pressure by a compressor 32 and is delivered under pressure through a line 33 to the absorption tower 20 where it is discharged through nozzles 34. A pressure regulator 35 on the absorption tower controls the pressure therein to maintain same substantially at a predetermined pressure. An excess of carbon dioxide gas is normally delivered from the source of supply to the absorption tower and the pressure regulator 35 vents said excess through a line 36 to the bubbler plate 7 in the separator section 3.

The treating section 4 of tank 2 contains iron material 14 which may be in the form of chips, particles or other forms, the only requisite being that the treating bed is porous to the flow of liquid therethrough. It is highly desirable to prevent short circuiting flow through the treating bed which may be caused by an uneven distribution of chips or particles therein, or by the level of liquid 6 rising above the upper level of the bed, because portions of fluid would then pass the treating section without coming into sufficient contact with the treating metal, reducing efficiency.

In practicing this invention, waste water containing chromates in solution enters separator tank 3 from pipe 1. Such water very often contains free oil or small solid particles in suspension which, for more efficient results, should be separated from the water prior to the treatment for chromate removal since such materials may coat the iron particles, close openings in the bed or otherwise interfere with chemical reactions in the treating bed. In order to separate the free oil and particles from the water, carbon dioxide gas is delivered by the line 36 to the bubbler plate 7 and dispersed as bubbles at the bottom of separator section 3 of tank 2 to aid gravitational separation of the water and such materials by floating the free oil and particles to the surface where they can be drawn off by gravity through the pipe 9. The bubbles of gas rising in separator tank 3 perform a function in addition to the flotation of foreign material which is, like the absorption tower, to dissolve carbon dioxide into the water to create an acidic condition rendering it highly reactive with ferrous materials. The solution leaves the separator section 3 and flows through the baffle 11 into the treatment bed 15 where, it is believed, a carbonic acid-ferrous corrosion process takes place, forming a reactive ferrous bicarbonate complex which is highly efficient in reducing chromate ions. The products of the process are inert hydroxides of iron and chromium which take the form of precipitates.

As the solution passes through the treating bed, flow resistance thereof or friction loss causes dropping of the level 6 of the solution as it passes toward the outlet section 5. If desired, the treating bed 15 may be tilted slightly so that its upper surface slopes at approximately the same extent as the solution surface level 6 passing therethrough. It is to be noted that the process may be satisfactorily carried out by passing the solution vertically through the bed or at any convenient angle so long as the solution comes into intimate contact with reactive ferrous metal surface.

When the solution leaves the treating bed, it flows through the baffle 12 into outlet section 5 where part of it is drawn off through effluent pipe 17. The major portion of the solution entering outlet section 5, however, passes through a recycle process during which carbon dioxide is dissolved into the solution. In recycling, the pump 19 withdraws the solution from outlet section 5 and pumps it under appropriate pressure into the absorption tower 20 where it gravitates down through bubble caps or packing 21 in the presence of carbon dioxide. The vast majority of carbon dioxide dissolution occurring in this process takes place in the absorption tower rather than in the separator section 3. Since impurities found in common waste flue gas do not adversely affect this process, the carbon dioxide may be pumped into the absorption tower in this form, although it is apparent that it may be obtained from other sources. A pressure of 40 p.s.i.g in the absorption tower with a solution temperature of about 78° F. has been found to be satisfactory, although variations of pressure to 150 p.s.i.g. (pounds per square inch gauge) and higher are usable and temperature, within wide limits, is not critical. Economic conditions, such as the cost of powering the pumps, will determine the optimum working pressure in the absorption tower. It is preferable that the solution in the absorption tower dissolve sufficient carbon dioxide to become super-saturated at atmospheric pressure and operating temperature so that as it enters the treatment bed bubbles of carbon dioxide will form which aid in keeping the solution in a high state of turbulence for maximum contact with the reactive ferrous metal surface, as well as preventing residue from clogging the bed. Super-saturation also helps ensure that the solution pH will be low enough to promote the process reaction regardless of the pH of the raw waste water.

The use of recycle flow, by increasing the rapid movement of fluid through the bed, permits the handling of large quantities of water in a relatively small apparatus, as well as maintaining high turbulence for efficiency and helping to prevent clogging or plugging of the bed. Recycle flow is also beneficial in that the dilution effect at the inlet of the treatment bed 13 is greater, being directly proportional to the recycle ratio. This prevents the passivation of the bed due to high chromate concentrations at the inlet.

This process has several distinct advantages over prior processes of chromate removal in that only inexpensive treating materials are required, and the process may operate continuously without appreciable labor cost. Ferrous chips or particles are produced in large quantities by metal fabricating plants and are usually sold as waste material. Such material provides a satisfactory ferrous reactive material for charging the treatment bed 15. As stated above, the carbon dioxide used in this process is suitable in the form of waste flue gas which would otherwise be released to the atmosphere through a boiler stack or the like.

Within wide limits, the conditions of operation of this process need not be adjusted for varying concentrations of chromates in the waste water since the process does not produce side reactions which result in other toxic compounds if the water is overtreated. If a significant change in chromate concentration is expected to occur over a long period of time, it is usually necessary only to vary the flow through pump 19 and correspondingly adjust the valve 25 to change the recycle rate so that maximum efficiency can be attained without undue loss of ferrous material through excess corrosion.

It has been found that the process conditions are not critical so long as sufficient carbon dioxide is forced into solution. The chromate removal efficiency is generally increased as the carbon dioxide solution concentrations and recycle flow rates are increased.

With low chromate concentrations, the process may be carried out satisfactorily if flue gas is simply bubbled through a chip bed at atmospheric pressure, dispensing with the absorption tower and allied equipment.

An example of a set of satisfactory conditions for 99-plus percent removal of chromates from the wash water is:

| | |
|---|---|
| Chromate solution feed rate _____ gal./min__ | 1.0 |
| Chromate feed concentration _____ parts/million__ | 20 |
| Chromate feed pH entering chip bed_____ | 7.0 |
| Chromate feed temperature _____ ° F__ | 78 |
| Recycle ratio _____ | 7.0 |
| Recycle flow through absorption tower__ gal./min__ | 7 |
| Flue gas flow to absorption tower _____ s.c.f.m__ | .80 |
| Flue gas flow vented from absorption tower_ s.c.f.m__ | .75 |
| Absorption tower operating pressure_____ p.s.i.g__ | 40 |
| Treatment bed—loosely packed chips— | |
| Width, 30" | |
| Height, 30" | |
| Length, 10'6" | |

In the above example, s.c.f.m. means cubic feet per minute reduced to standard conditions.

One skilled in the art can vary the size of the treatment bed and flow rates to produce other satisfactory operating conditions. It is to be understood that while we have illustrated and described certain forms of our invention, it is not to be limited to the specific forms or arrangements herein described and shown except insofar as such limitations are included in the claims.

What we claim and desire to secure by Letters Patent is:

1. The process of reducing and precipitating toxic chromate compounds from a solution of effluent waste waters containing materials not in solution comprising, bubbling flue gas containing carbon dioxide through the solution at atmospheric pressure to float said materials to the surface of the solution and carbonate said solution, removing said materials by gravity separation, passing the solution into intimate contact with a ferrous metal chip bed at a high flow rate to increase turbulence and prevent clogging of the bed with residue, exposing said solution to flue gas containing carbon dioxide under a pressure above atmospheric so that the solution becomes super-saturated when the solution is released to atmospheric pressure, using excess flue gas for said bubbling at atmospheric pressure, and at least once repassing the solution through the ferrous metal chip bed wherein said super-saturated condition produces bubbles which maintain a condition of high turbulence in said bed.

2. The method of treating industrial waste water containing free oil and chromates in solution comprising, bubbling carbon dioxide gas through said water to aid said free oil in rising to the surface thereof and carbonate said water, separating the free oil from the surface thereof, passing said water through a restricted treating passage wherein it comes into intimate contact with chips of ferrous metals, withdrawing said water from said chips, pumping said water at about 78° F. into an absorption tower, pumping flue gas containing carbon dioxide into said absorption tower under a pressure of about 40 p.s.i.g. wherein it is exposed to said water being absorbed therein so as to produce supersaturated conditions upon release of said water to atmospheric pressure, repassing said water through said restricted treating passage, and withdrawing a minor portion of said treated water from the system, allowing the balance to recycle through the above steps.

3. The method of treating industrial waste water containing free oil and chromates in solution comprising, passing said water through a separation section, introducing carbon dioxide in the form of bubbles dispersed at the bottom of said separation section to effect flotation of said oil and carbonate said water, drawing off said oil, flowing said carbonated water through a porous bed of iron particles, collecting the treated water, removing a major portion of flow from said collection, and contacting said flow with carbon dioxide under pressure to carbonate same, flowing said carbonated water through said bed, and withdrawing the excess of flow from the collection for disposal.

4. The process of reducing and precipitating toxic chromic compounds from a solution of effluent waste waters comprising, passing the solution into intimate contact with a ferrous metal chip bed at a high flow rate to increase turbulence and prevent clogging of the bed with residue, exposing said solution to flue gas containing carbon dioxide under a pressure above atmospheric so that the solution becomes super-saturated with carbon dioxide when the solution is released to atmospheric pressure, and at least once repassing the super-saturated solution through the ferrous metal chip bed wherein said super-saturated condition produces bubbles which maintain a condition of high turbulence in said bed and the carbon dioxide activates said bed to reduce the chromates in said solution.

5. The method of treating industrial waste water containing chromates in solution comprising, passing chromate-containing waste water through a restricted treating passage wherein it comes into intimate contact with chips of ferrous metals, withdrawing said water from said chips, pumping said water at about 78 degrees F. into an absorption tower, pumping flue gas containing carbon dioxide into said absorption tower under pressure of about 40 p.s.i.g. wherein it is exposed to said water and is absorbed therein so as to produce super-saturated conditions upon release of said water to atmospheric pressure, repassing said water with carbon dioxide therein through said restricted treating passage to activate said ferrous chips for reduction of the chromates in said water, and withdrawing a minor portion of said treated water from the system for disposal as non-toxic waste and allowing the balance of said water to recycle through the above steps.

6. A method for the reduction and precipitation of chromates in aqueous industrial wastes which comprises, the steps of dissolving flue gas containing carbon dioxide into the wastes to carbonate same, passing the carbonated wastes rapidly through a bed of ferrous chips to activate said bed, recycling the wastes that pass through said ferrous chip bed at least once through the steps of dissolving flue gas containing carbon dioxide therein and again passing the wastes through said activated ferrous chip bed to maintain a rapid flow therethrough for reduction of the chromates in said flow of wastes, and withdrawing a portion of the wastes after passage thereof through said ferrous chip bed for disposal as non-toxic waste.

References Cited in the file of this patent

UNITED STATES PATENTS

| 2,756,208 | Axelrad et al. | July 24, 1956 |
| 2,766,203 | Brown et al. | Oct. 9, 1956 |

OTHER REFERENCES

"Treatment and Disposal of Waste Waters Containing Chromate," Grindley, J. Soc. Chem. Ind., vol. 64 (1954), pp. 339–344.

"Disposal of Waste Liquors From Chromium Plating," Hoover et al., Ind. Eng. Chem., vol. 33 (1941), pp. 131–134.

Industrial and Engineering Chemistry (periodical), vol. 46, No. 11, page 85A (November 1954), article by Powell, 210–59.

Industrial Wastes (periodical), vol. 4, No. 1, page 13 (January 1959), 210–59.